(12) United States Patent  (10) Patent No.: US 7,507,126 B2
King, Jr. et al.  (45) Date of Patent: *Mar. 24, 2009

(54) OPEN FACE ELECTRICAL CONNECTOR

(76) Inventors: Lloyd Herbert King, Jr., 394 Larimore Valley Dr., Chesterfield, MO (US) 63005; Michael Belgeri, 1007 Bridgeport, Ellisville, MO (US) 63011; James Keeven, 2641 Whitetail La., O'Fallon, MO (US) 63366; William Hiner, 8 Briarcastle Ct., O'Fallon, MO (US) 63366

( * ) Notice: Subject to any disclaimer, the term of this patent is extended or adjusted under 35 U.S.C. 154(b) by 0 days.

This patent is subject to a terminal disclaimer.

(21) Appl. No.: 11/788,339

(22) Filed: Apr. 19, 2007

(65) Prior Publication Data

US 2008/0032535 A1  Feb. 7, 2008

Related U.S. Application Data

(60) Division of application No. 11/372,237, filed on Mar. 9, 2006, now Pat. No. 7,223,132, which is a continuation-in-part of application No. 10/724,890, filed on Dec. 2, 2003, now Pat. No. 6,966,634.

(51) Int. Cl.
    *H01R 4/32* (2006.01)

(52) U.S. Cl. .................... 439/778; 439/521
(58) Field of Classification Search ............ 439/521, 439/522, 778, 779, 780, 936
See application file for complete search history.

(56) References Cited

U.S. PATENT DOCUMENTS

| | | | | |
|---|---|---|---|---|
| 4,451,696 A * | 5/1984 | Beinhaur | .............. | 174/92 |
| 4,883,431 A * | 11/1989 | Uken et al. | .............. | 439/521 |
| 4,998,894 A * | 3/1991 | Gronvall | .............. | 439/521 |
| 5,569,882 A * | 10/1996 | Yokoyama et al. | .............. | 174/76 |
| 5,816,853 A * | 10/1998 | Buekers et al. | .............. | 439/521 |
| 6,854,996 B2 * | 2/2005 | Yaworski et al. | .............. | 439/276 |
| 7,037,158 B2 * | 5/2006 | Mishima | .............. | 445/24 |
| 7,044,776 B2 * | 5/2006 | King et al. | .............. | 439/521 |
| 7,223,132 B2 * | 5/2007 | King et al. | .............. | 439/778 |

* cited by examiner

*Primary Examiner*—Thanh-Tam T Le
(74) *Attorney, Agent, or Firm*—Jacobson & Johnson

(57) ABSTRACT

An open-face electrical wire connector for forming an electrical connection to a wire connector lug wherein the wire connector lug, which is free of any sealant can be brought into engagement with another portion of a housing, which carries a sealant, to cause the sealant to flow around the wire connector lug and the electrical connection therein for on-the-go formation of a sealant covered electrical connection.

6 Claims, 8 Drawing Sheets

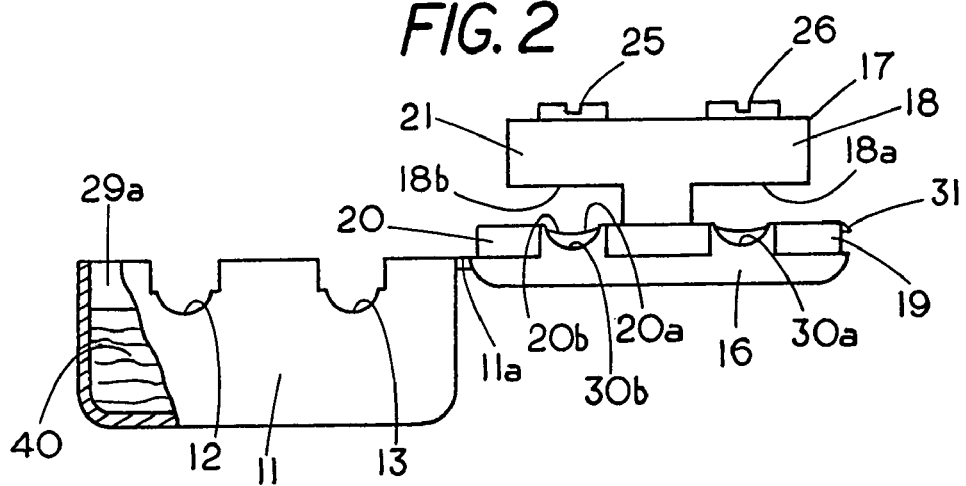
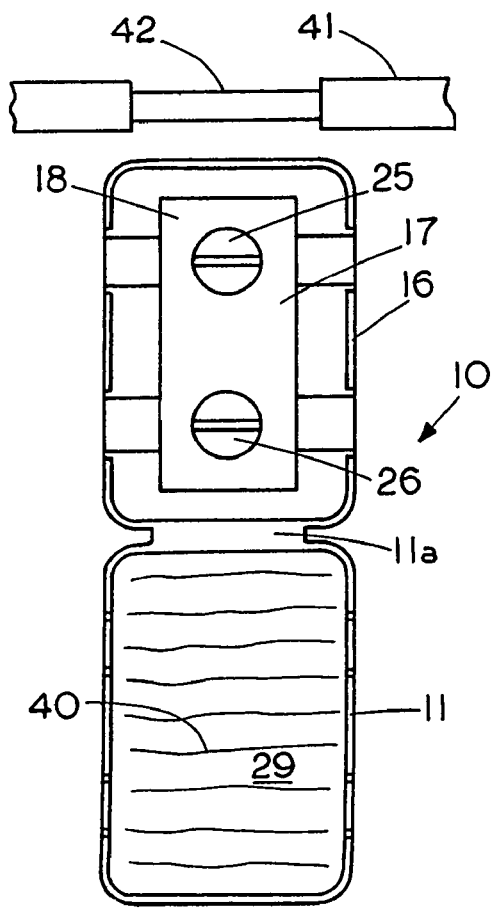
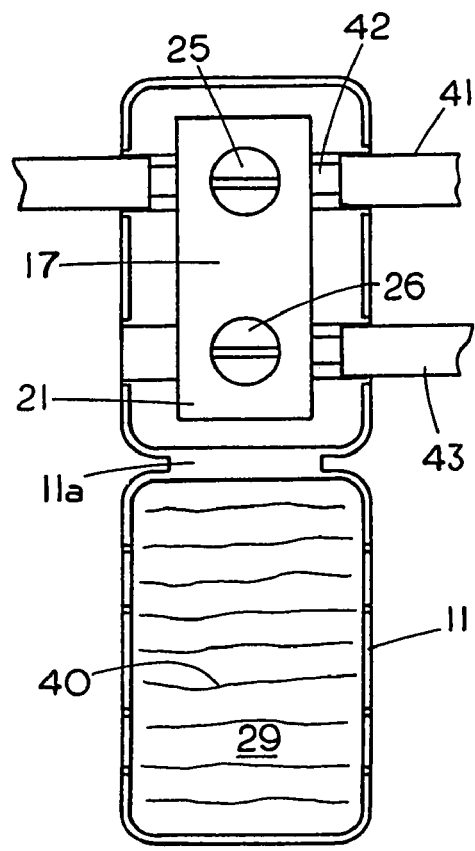

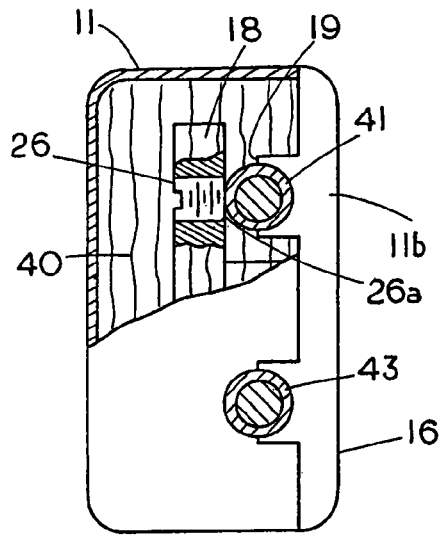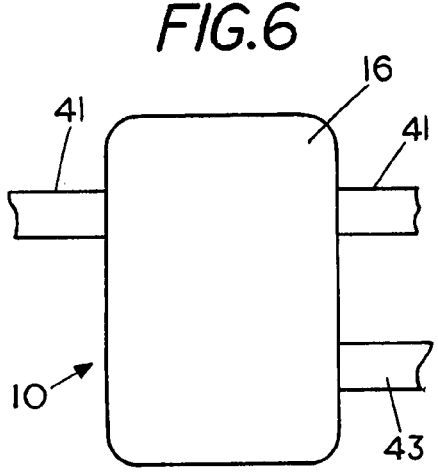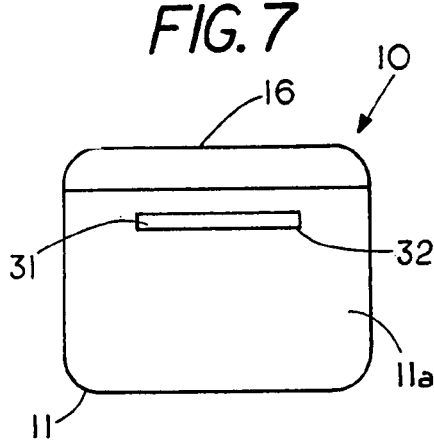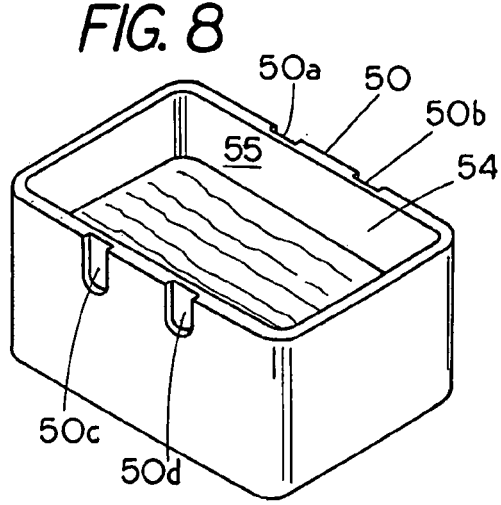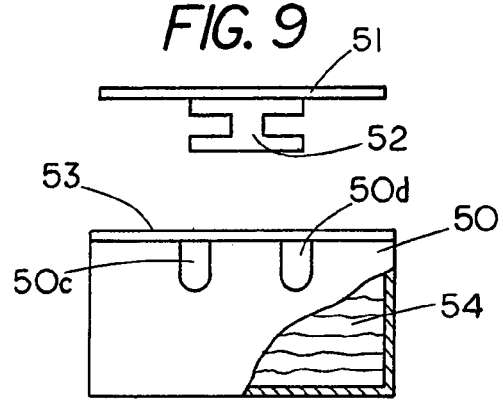

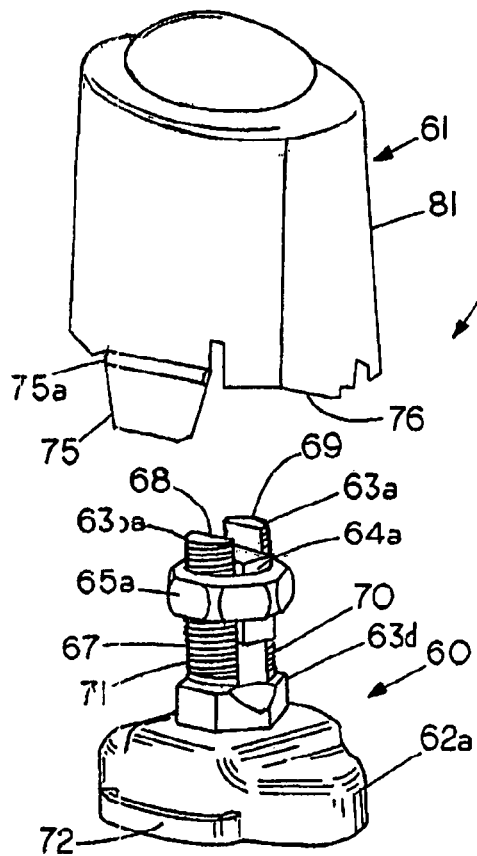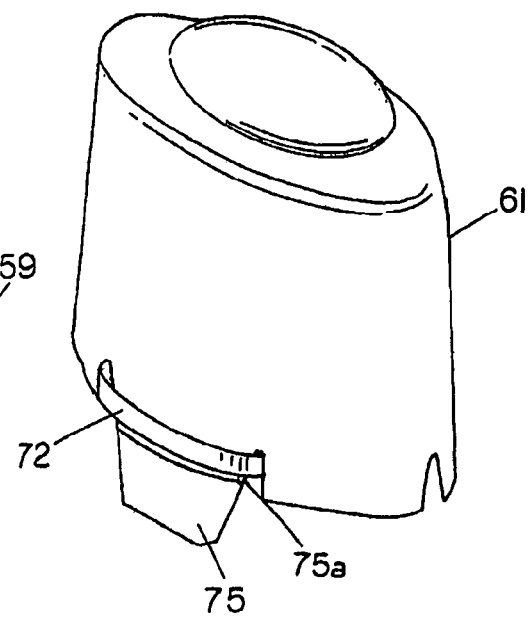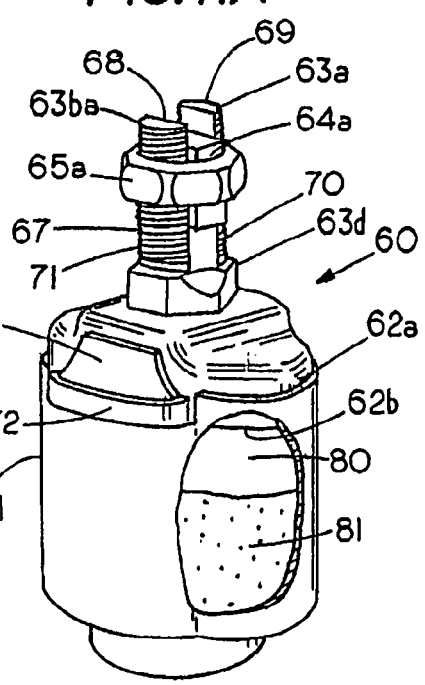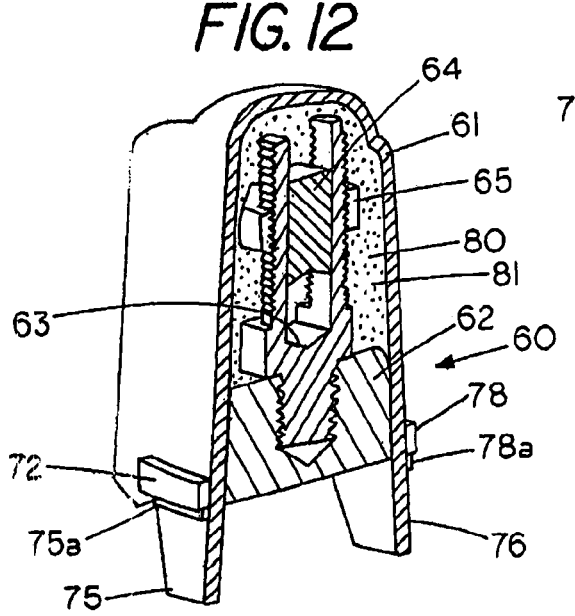

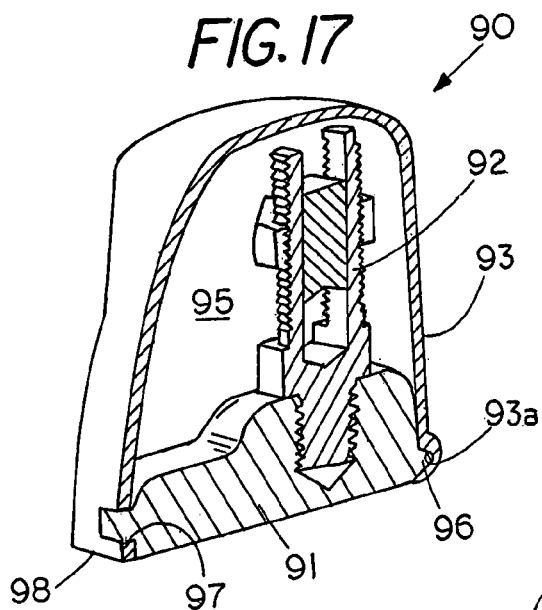
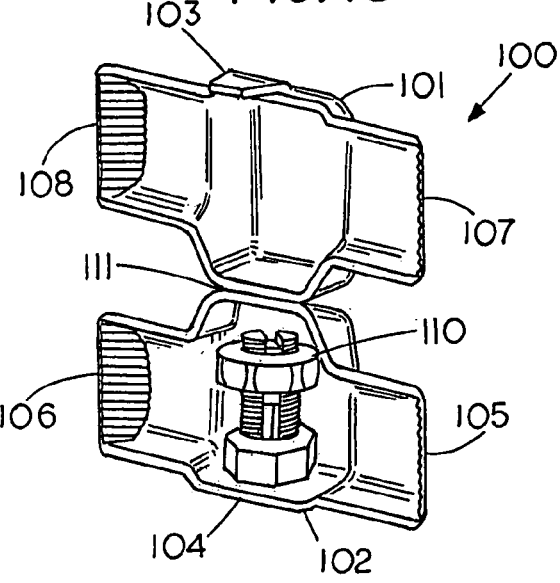
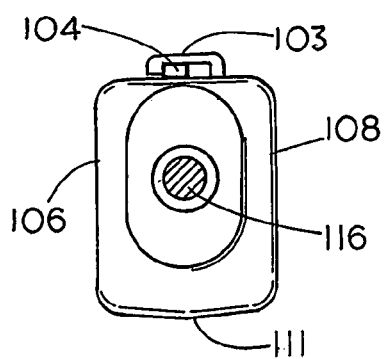
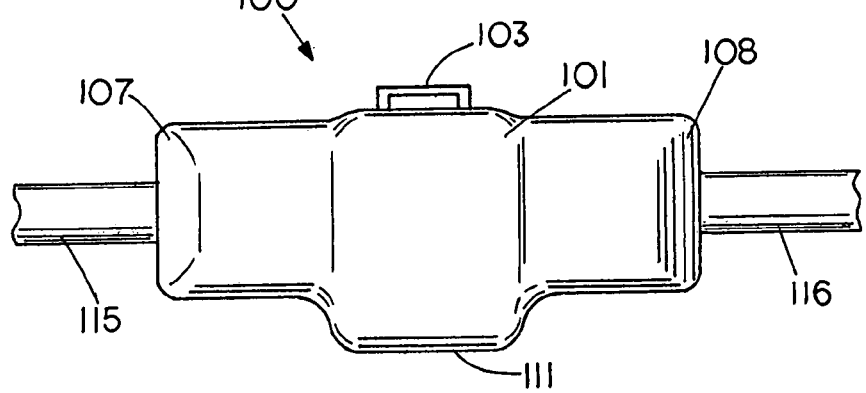

OPEN FACE ELECTRICAL CONNECTOR

CROSS REFERENCE TO RELATED APPLICATIONS

This is a divisional application of U.S. patent application Ser. No. 11/372,237 now U.S. Pat. No. 7,223,132 filed Mar. 9, 2006, which is a continuation in part of U.S. patent application Ser. No. 10/724,890 Title Wire Connector Filed Dec. 2, 2003 now U.S. Pat. No. 6,966,634.

FIELD OF THE INVENTION

This invention relates generally to wire connectors and, more specifically, to an open-face wire connector for on-the-go formation of a sealant covered electrical junction.

STATEMENT REGARDING FEDERALLY SPONSORED RESEARCH OR DEVELOPMENT

None

REFERENCE TO A MICROFICHE APPENDIX

None

BACKGROUND OF THE INVENTION

One of the ways of formation of on-the-go sealant covered electrical connection in twist on wire connectors is disclosed in King U.S. Pat. Nos. 5,151,239; 5,113,037; 5,023,402 and U.S. Re. Pat. No. 37,340 which show a twist on wire connector that allows on-the-go formation of a sealant covered electrical connection in the presence of a sealant.

The twist-on type of wire connector is well suited for joining two or more wires into an electrical connection with each other. Other applications such as the formation of connection to branch lines or the formation of electrical connections to other types of lugs generally require that the connection be made to the wire connector lug and the sealant is then poured or injected into the housing to encapsulate the electrical connections therein.

The Simmons U.S. Pat. No. 6,025,559 discloses a tubular housing having a twist-on wire connector where the wires are twisted into a coil and the wires and the wire holder are forced into a sealant located at the end of the tubular housing.

Still another embodiment of a tubular is shown in King U.S. Pat. No. 6,051,791 wherein a two part connector containing a connector is made in a shoe and the shoe with the electrical connector is forced into a tubular member containing a sealant.

In contrast, the embodiments of the present invention include an open-face connector that permits on-the-go formation of an electrical connection on a connector lug, which is free of any sealant and is located in one part of a housing, and then once the electrical connection is formed to the electrical lug the user brings another part of the housing, which is carrying a sealant, into engagement with the part of the housing carrying the electrical lug to cause the sealant to flow around the wire connector lug and the electrical connections therein.

SUMMARY OF THE INVENTION

An open-face electrical wire connector for forming an electrical connection to a wire connector lug wherein the wire connector lug, which is free of any sealant, is located in a portion of a housing that can be brought into engagement with another portion of a housing, which carries a sealant, to cause the sealant to flow around the wire connector lug and the electrical connection therein for on-the-go formation of a sealant covered electrical connection.

BRIEF DESCRIPTION OF THE DRAWINGS

FIG. 2 is a side view of the wire connector of FIG. 1;

FIG. 3 is a top view of the wire connector of FIG. 1 in the open condition and a partially stripped electrical wire and a sealant in one part of the housing;

FIG. 4 is a top view of the wire connector of FIG. 3 in the open condition with electrical wires connected thereto;

FIG. 5 is a partial side section view showing the wire connecting junction encapsulated in the sealant;

FIG. 6 is a top view of the wire connector of FIG. 3 in the closed condition;

FIG. 7 is an end view of the wire connector housing showing the two housings in an engaged condition;

FIG. 8 is a perspective view of an alternate embodiment of the invention;

FIG. 9 is a elevation view of the embodiment of FIG. 8 with a separate cover for attachment to the housing;

FIG. 10 is an exploded view of a split bolt connector and cover that permits on-the-go sealabilty of an electrical junction;

FIG. 11 shows the split bolt connector and cover in an assembled condition;

FIG. 11A shows the split bolt connector cover in a transport condition;

FIG. 12 shows a sectional view of the assembled split bolt connector and cover of FIG. 11;

FIG. 17 shows a sectional view of split bolt connector with a hinged cover of FIG. 16;

FIG. 18 is an open face view of an alternate embodiment of a split bolt connector;

FIG. 19 is a front view of the open face connector of FIG. 18 in a closed condition on a wire splice;

FIG. 20 is an end view of the open face connector of FIG. 19;

DESCRIPTION OF THE PREFERRED EMBODIMENT

Figure 1:
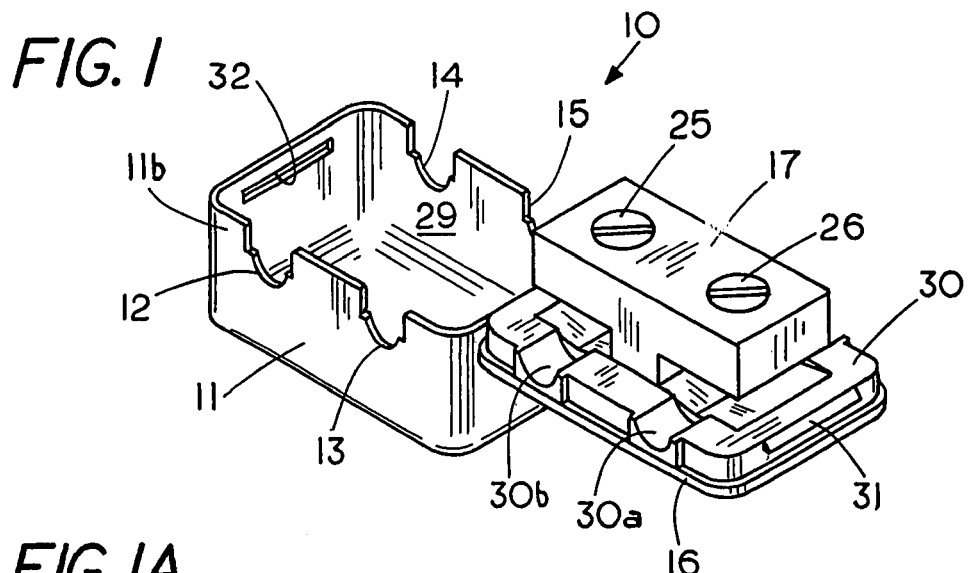
FIG. 1 is a perspective view of the on-the-go sealable wire connector.

FIG. 1 is a perspective view of an open-face electrical connector 10 that permits on-the-go sealablity of an electrical junction after an electrical connection has been formed. The open-face wire connector 10, which is a clam shell type wire connector, is shown in the empty or non-sealant carrying condition. The wire connector 10 including a first open top housing 11 for receiving and holding a sealant and a second housing or cover 16 that contains no sealant. Cover 16 and housing 11 are hinged to each other for forming an enclosure when the cover 16 and housing are mated to each other. In the embodiment shown hinge 11a (FIG. 2) includes a bias to hold the cover in a laterally extended condition from the housing so as to make the wire connector lug 17 readily accessible for forming an electrical connection. Housing 11 and housing 16 are formed of an electrical insulating material such as a polymer plastic. Housing 11 includes an open top chamber or open top sealant reservoir 29, which is surrounded by a sidewall 11b. Sidewall 11b includes a set of side wire access openings or wire relief areas 12, 13, 14 and 15 for extending wires into and out of the chamber 29 in housing 11.

Open face connector 10 can be used in various modes. If there is no sealant present in chamber 29 the connector 10 can be used to form a protective housing around an electrical junction by closing cover 16 on housing 11. On the other hand if a user wants to use a sealant on certain connections but not on other types of connections the user can place the sealant in those open face connectors that require sealant and leave the other connections without sealant.

The cover 16 includes a support member 30 holding a wire connection member or wire connector lug 17 therein. Cover 16 has a mating shape with housing 11 so that when the cover 16 and housing 11 are brought into engagement with each other they form an enclosure to inhibit and maintain the sealant in chamber 29. In the embodiment shown the cover 16 and housing 11 are made from a polymer plastic with a living hinge 11a (see FIG. 2) therebetween to allow for maintaining the cover 16 and housing 11 proximate each other when the wire connector 10 is in the open condition. In addition, the hinge 11a allows one to rotate the cover 180 degrees thereabouts to bring the cover into mated engagement with the housing 11. In the normal condition the cover 16 is held in an open and extended condition so as not to contact the sealant that is placed in housing chamber 29.

Located on cover 16 is the wire connector lug 17, which is held in an extended position so that a user can have free access to the screw fasteners 25 and 26. That is, electrical connections can be made to lug 17 as if lug 17 where independent of cover 16. A further feature of the invention is that if the connector lug 17 is frictionally maintained in cover member 30 the connector lug 17 can be removed for independent attachment of a wire or wires thereto. Once connected the user can then place the connector lug in the cover member 30 and close the cover 16 to bring the connector lug into the sealant.

Figure 1A:
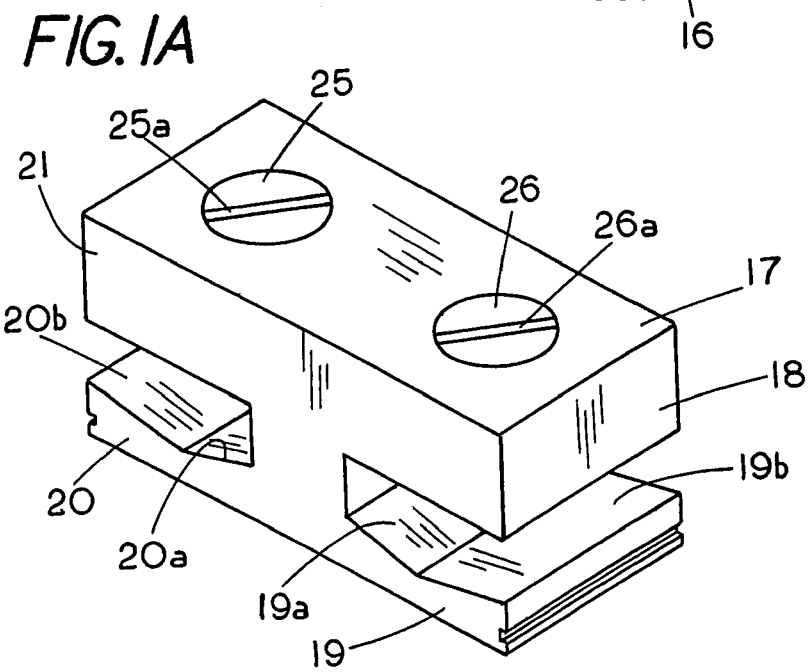
FIG. 1A is a perspective view of a wire connector lug for inclusion in the wire connector of FIG. 1.

FIG. 1A shows that wire connector lug or wire connection member 17, which comprises an I shaped wire connecting lug, has been removed from support member 30. In the embodiment shown the sides of wire connector lug 17 frictionally engage support member 30 to maintain the wire connector lug 17 in member 30 to allow for the removal if desired. Wire connection lug 17 includes a first open jaw 18 and a second open jaw 19 at one end for laterally inserting an electrical wire therebetween. Jaw 19 includes a V shaped surface 19a and 19b forming a wire locator for centering an electrical wire thereon. A threaded member 26, such as a slot headed set screw, is retained in rotational engagement with jaw 18 by a female thread located in jaw 18 (not shown). A slot 26a allows one to rotate the threaded member 26 to bring a connecting end of threaded member 26 into pressure contact with an electrical wire therein to thereby bring the wire connection lug into electrical contact therewith. The opposite end of wire connector lug 17 is identical and includes an upper jaw 21 with a threaded member 25 having a slotted head 25a for rotating threaded member 25. Similarly, located on lower jaw 20 is a V shaped wire centering surface comprising flats 20a and 20b.

In the embodiment shown the electrical connector lug comprises an electrical conducting material such as metal and includes a base section that frictionally fits into the support 30 to hold the wire connection lug in position. The outer housing 11 and 16 preferably comprise an electrically insulating material to thereby electrically isolate the wire connection therein. While a wire connection lug for forming a branch attachment to a main line without cutting the main line is shown the present invention is usable with other types of electrical connector lugs.

Figure 1B:
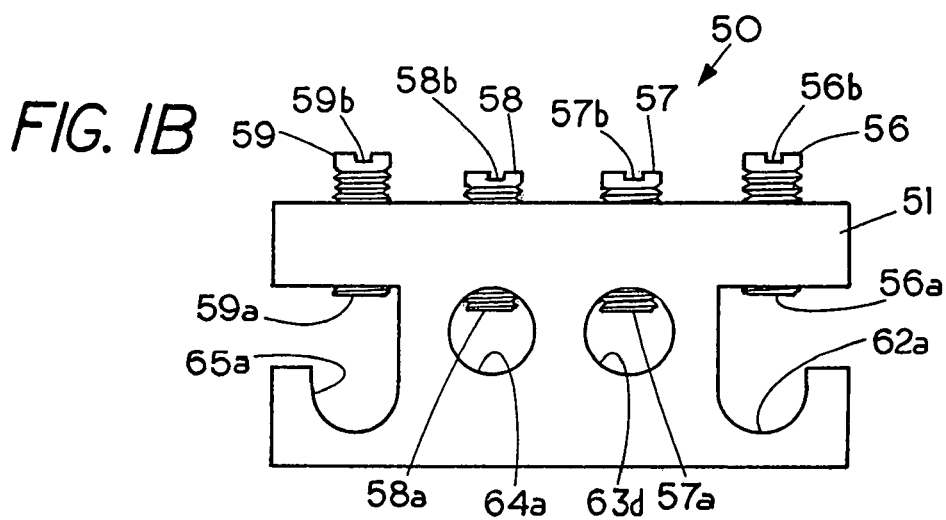
FIG. 1B is a perspective view of a multiple channel wire connector lug for inclusion in the wire connector of FIG. 1.

FIG. 1B shows a multiple wire connector lug 50 comprising a metal or electrically conducting block 51 having a J shaped wire receiver 65a on one end and a J-shaped wire receiver 62a on the opposite end. A screw 56 is rotatable mounted in a set of female threads (not shown) in lug 51. A slot 56b permits one to rotate screw 56 and bring screw end 56a into pressure engagement with a wire or wires that are positioned in wire receiver 6fwi 2 to thereby hold the wire or wires in position and electrical contact. Lug 50 also contains female threads (not shown) for screws 57, 58 and 59. An identical wire receiver 65a is located on the opposite end and also includes a screw 59 having a slot 59b for bringing screw end 59a into pressure engagement with a wire or wires located in wire receiver 65a to thereby form an electrical connection. The wire connector lug 50 also contains through cylindrical shaped wire receivers 63d and 64a for forming electrical connections therewith. That is, a screw 58 having a slot 58b allows one to rotate screw 58 to bring end 58a into pressure contact with a wire or wires in wire receiver 64a. Similarly, a screw 57 having a slot 57b allows one to rotate screw 57 to bring screw end 57a into pressure contact with a wire or wires located in wire receiver 63d. While the invention is shown with the sealant in the portion of the housing that is separate from the connector it is envisioned that a smaller amount of sealant can be placed directly in the wire receivers 62a, 63d, 64a and 65a. This is particularly useful when one wants to cover only the exposed end of a wire.

FIG. 2 shows a side view of the electrical connector of FIG. 1 in the open-face condition and with the chamber 29 partially filled with a sealant 40. In the preferred embodiment the sealant 40 comprises a viscous sealant such as silicone or the like which is retained in the housing if the housing 11 is tipped during handling or forming the electrical connection to the wire connector lug 17. Other types of sealant, such as epoxy sealants, could also be used in the present invention. The wire connector lug 17 is spaced from the sealant containing chamber 29 so as to allow a user to first form an electrical connection before bringing the sealant into contact with the connector lug. The rotatable screw fasteners 25 and 26 are located in a retracted condition so that a first electrical wire can be extended between the jaws 18 and 19 and a second electrical wire can be extended between the jaws 20 and 21. In the embodiment shown, the cover 16 includes a wire relief area 30b for fitting around an exterior circumferential portion of a first wire passing therein. Similarly, shown, the cover 16 includes a wire relief area 30a for fitting around an exterior circumferential portion of a second wire passing therein. Preferably wire relief areas 30a in cover 16 and wire relief area 12 in housing 11 coact with each other so that when closed they can each encompass about half a cylindrical wire.

Similarly, wire relief area 30b and 13 coact with each other to each encompass about half a cylindrical wire extending through the sidewall of the wire connector 10.

Housing 11 includes a latch member 32 comprising an elongated slot 32 (FIG. 7) which can form latching engagement with a further latch member comprising a lip 31, which is located on cover 16. When cover 16 is closed on top of housing 11, as shown in FIG. 7, the lip 31, which protrudes from the housing 11, engages the sidewall 11a to latch and cooperatively hold the wire connector in a closed condition.

FIG. 2 shows the sealant 40 having a volume that partially fills chamber 29 when the cover and wire connector lug are in the open condition. When the wire connector lug 17 and cover are brought into the closed condition there should be sufficient sealant in chamber 40 so that the sealant 40 is forced to flow around and encapsulate the electrical junctions therein as the free volume 29a of chamber 29 is reduced by the insertion of the wire connector lug therein. In one embodiment the free volume 29a of chamber 29, as illustrated in FIG. 2, is about equal to the volume of the wire connector lug and the wires inserted therein so as to force the sealant to flow around and encapsulates the electrical connection in the electrical connector lug 17 when the lug 17 is brought into the housing to thereby protect the electrical connections from adverse environmental conditions. In another embodiment the sealant can be positioned so that the wire connector lug is immersed in a reservoir of sealant therein.

FIG. 3 shows the on-the-go wire connector 10 and an electrical wire 41 that has been partially stripped to expose the conducting member 42. In the embodiment shown the electrical wire comprises an uncut electrical wire that a branch connection is to be formed thereto without having to sever the main line. That is, one wishes to connect a branch line to conductor 42 without having to sever wire 42.

With the wire connector 10 in the open condition and the chamber 29 contains a sealant therein one can form an electrical connection by placing the stripped wire 42 between upper jaw 18 and lower jaw 19 (see FIG. 3 and FIG. 4) and then rotating the threaded member 26 to bring the wire 42 into electrical contact. Once in electrical contact a branch line such as electrical wire 43 can be connected to the other end of lug by placing the electrical wire 43 between upper jaw 21 and lower jaw 20.

Thus the method of forming a branch attachment to an electrical wire without having to cut the electrical wire comprising the steps of: 1. forming a first housing 11 having a chamber 29 therein and placing a sealant 40 in the first housing. 2. forming a second housing with an electrical connection member 17 thereon. 3. Inserting an electrical wire 41 into the electrical connection member 17. 4. Placing the first housing 11 and the second housing 16 in engagement to cause the sealant 40 in the first housing 11 to flow around an electrical junction in the electrical connection member 17.

By placing a sufficient amount of a viscous sealant in the first housing 11 it allows one to bring the second housing 16 into engagement and causes the sealant 40 in the second housing to flow around the wire connection member 17 to form a waterproof electrical connection therein. At the same time the connection to the electrical connector lug is made when the connector lug is free of any sealant.

When the wire connector lug has open jaws the wire connector 10 can be used to form a branch line to the main line without severing the main line by the step of stripping a portion of an electrical wire 41 and inserting the stripped portion 42 into the wire connection member 17 and between the open jaws of the wire connector 17.

FIG. 5 is a partial sectional view showing a side view of the wire connector 10 revealing a partial cutaway of jaw 18 showing the threaded member 26 having an end 26a in pressure contact with electrical wire 41 located in the wire connector 10. As can be seen in FIG. 5 the volume of sealant 40 is sufficient so that when the cover 16 and housing 11 are brought together the lug and wires force the sealant to flow around the electrical junction between the opposing jaws 18 and 19 of lug 17.

FIG. 6 shows the wire connector 10 in the closed condition with the main line electrical wire 41 extending from opposite sides of wire connector 10. The branch line 43, which is connected to the main line 41 within wire connector 10, extends laterally outward form housing cover 16. As can be seen in FIG. 6 the present wire connector allows the wire to remain in a straight condition since the wire 41 need not be bent to form the electrical connection.

FIG. 7 is an end view of the on-the-go wire connector 10 in the closed condition with the cover 16 in a mated condition with housing 11 through engagement of lip 31 with slot 32 in housing sidewall 11a.

FIG. 8 is a perspective view of a wire connector housing 50 having a chamber 55 for carrying a sealant therein. Housing 50 contains a set of U-shaped knockouts 50a, 50b, 50c and 50d, which comprise weakened sections of the sidewalls of housing. The knockouts can be removed with a pliers or screwdriver to provide an entry region for the wires into and out of housing 50. In an alternate embodiment the knockouts could be replaced with a grommet like member to engage the wires as the wires extend into and through housing 50.

FIG. 9 shows an exploded view of the two-part connector with a first member 51 carrying a wire connector 52 thereon. Located below first member 51 is the second member 50, which comprises housing 50. A portion of housing 50 has been cutaway to reveal the sealant 54 contained in chamber 55. In the embodiment shown, a thin film of a penetrateable material 53 extends across the top of housing 50 to retain the sealant in the housing 50 while the housing is in the preuse condition. Preferably material 53 comes a punctureable layer of material that can either be torn away from the housing to reveal the chamber with the sealant 54 or can be punctured by insertion the wire connector 52 through the film 53 and into the housing 50. In either case the material 53 can provide a barrier to prevent escape of sealant and when coupled with a housing with knockouts comprises a sealed container that can store the sealant in a ready to use but non-spillable condition.

FIG. 10-12 show an open-face electrical connector 59 having a wire connector lug comprising a split bolt connector 60 for lateral insertion of an electrical wire therein, a cover latch 72, 78 on the base of the wire connector lug 60, a closed cover or housing 61 having a chamber 80 therein with a sealant 81 located in chamber 80 to enable the cover 61 to be secured to the latch 72, 78 as the sealant therein is brought into a wire encapsulating condition as illustrated in FIG. 12. In the embodiment shown the wire connector lug comprises an electrical conductor 60 and the first housing and the second housing comprise insulating members, such as polypropylene, for forming an electrically insulator around the wire connector lug 60.

More specifically, FIG. 10 is an exploded view of a split bolt connector 60 and a latching cover or housing 61 with an internal sealant-carrying chamber 80 therein that permits on-the-go sealabilty of an electrical junction. Split bolt connector 60 includes a base 62a and a split bolt 63d having an elongated member 63a on one side and an elongated member 63b on the opposite side. Elongated member 63a includes an inner non-threaded surface 69 and an exterior curved surface contains male threads 70. Similarly, elongated member 63b includes an inner non-threaded surface 68 and an exterior curved surface contains male threads 67. Located in threaded engagement with elongated members 63a and 63b is a nut 65a having a female thread therein (not shown). Slideably maintained between members 63a and 63b is a block 64a that can be brought toward base 62a to squeeze electrical wires in opening 71 into electrical contact with each other. Thus, with a split bolt connector the electrical wires are inserted into the opening 71 and the nut 65a is tightened to bring the block into pressure engagement with the wires therein to thereby form an electrical connection.

The split bolt connector 60 and latching cover provide an open face wire connector for quick and guided latching engagement with each other through cover latch or loop 72 on one side of base 62a and another identical latch or loop located on the opposite side of base 62a.

One side of cover 61 includes a first tapered extension 75 having a lip 75a and the opposite side includes a second tapered extension 76 also having a lip for engaging a loop on the opposite side of base 62a.

FIG. 11 shows the split bolt connector 60 and cover 61 in an assembled or latched condition with the extension 75 extending through loop 72 and the lip 75a in engagement with loop 72 to hold the cover thereon. Similarly, the extension 76 on the opposite side engages loop 78 with lip 78a engaging loop 78. (See FIG. 12)

FIG. 12 shows a sectional view of the assembled split bolt connector and cover of FIG. 11 with latch member 75 engaging loop 72 and latch member 76 engaging loop 78 to hold the cover or housing 61 in the latched position on base 62a. The chamber 80 is shown to contain a sealant 81, which can encapsulate the wire connection in the split bolt connector 60. That is, the housing 61 in the open face condition carries a sealant while the base housing 62 is free of sealant to permit the formation of an electrical connection between sliding member 64a and split bolt 63d without the presence of sealant on the split bolt connector. For purposes of clarity the wires that would be present in the opening in the split bolt 63d have been left out. Once the wires are secured to the wire connector lug, in this case the split bolt connector 60, one can place the cover or housing 61 with the sealant 81 therein on top of the base or second housing 62 to bring the sealant to an encapsulating condition around the wire connection in the wire connector 60.

FIG. 11A shows the split bolt connector of FIG. 10 in the transport condition. In the transport or storage condition the cover 61 is secured to the underside of the base housing 62 by inserting the ears or latch members 75 and 76 though the engaging loop 72 and 76 on opposite sides of base housing 62. That is, by having the latch members 75 and 76 symmetrical the latch members 75 and 76. can be secured either to the topside as shown in FIG. 12 or to the underside as shown in FIG. 11A. By securing the cover to the underside as shown in FIG. 11A one creates a storage compartment 80 that is capped by housing underside 62b with the storage compartment able to contain a sealant 81 for later use. By having sufficient sealant in the compartment 80 one can encapsulate the split bolt connector 60 when the cover is removed from the underside as shown in FIG. 11A and placed over the split bolt connector as shown in FIG. 12. FIG. 11A shows that the underside 62b of base housing forms a cap to retain the sealant 81 in the cover 61. As the latch members 75 and 76 can be secured to the loops 72 and 78 from either side one can store the split bolt connector with the sealant 80 and when ready to use one removes the cover 61 from base housing 62 and places the cover on top of the split bolt connector 60 which brings the sealant in cover 61 into a covered condition over the split bolt connector 60.

Thus, the open-face electrical connector of FIG. 11 the second housing 61 comprises a cover that is securable to either an underside of the first housing 62a or the topside of the first housing 62a with the cover 61 and the underside 62b of the first housing 62a cooperating to hold the sealant 81 in the cover 61 in a transport condition wherein the sealant is maintained within the cover 61. The latch, which includes extensions 75 or 76 enable one to secure the first housing 62a to the second housing 61 to enable covering either a topside of the first housing 62a or the underside of the first housing 62a. In this embodiment the base 62a of the first housing has lateral loops 72 and 78 and the cover extensions 75 and 76 coact to form an enclosure for storing sealant during transport.

Figure 13:
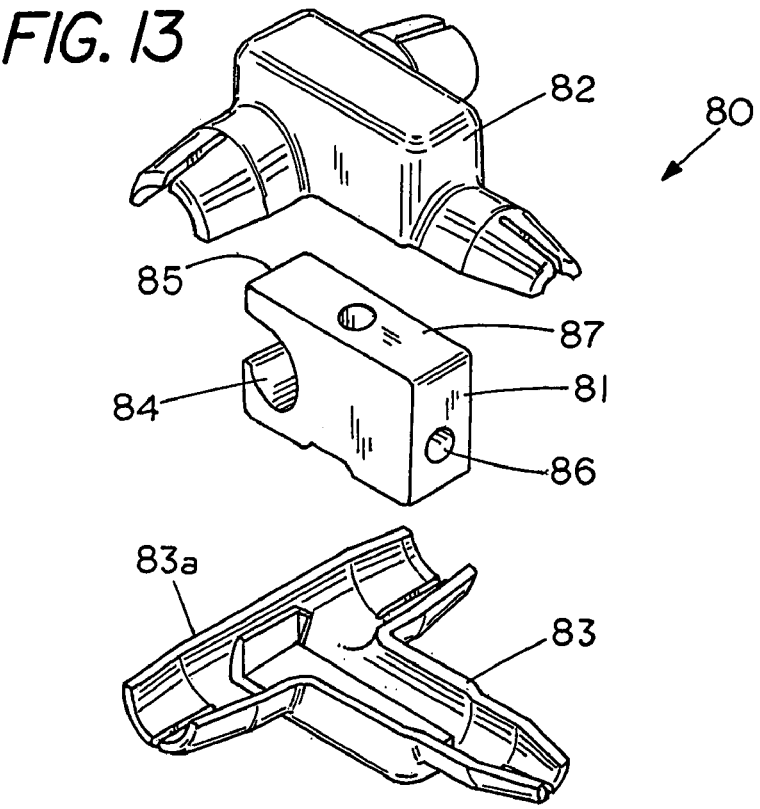
FIG. 13 shows an exploded view of a branch connector and two part cover that permits on-the-go sealibity of an electrical junction.
Figure 14:
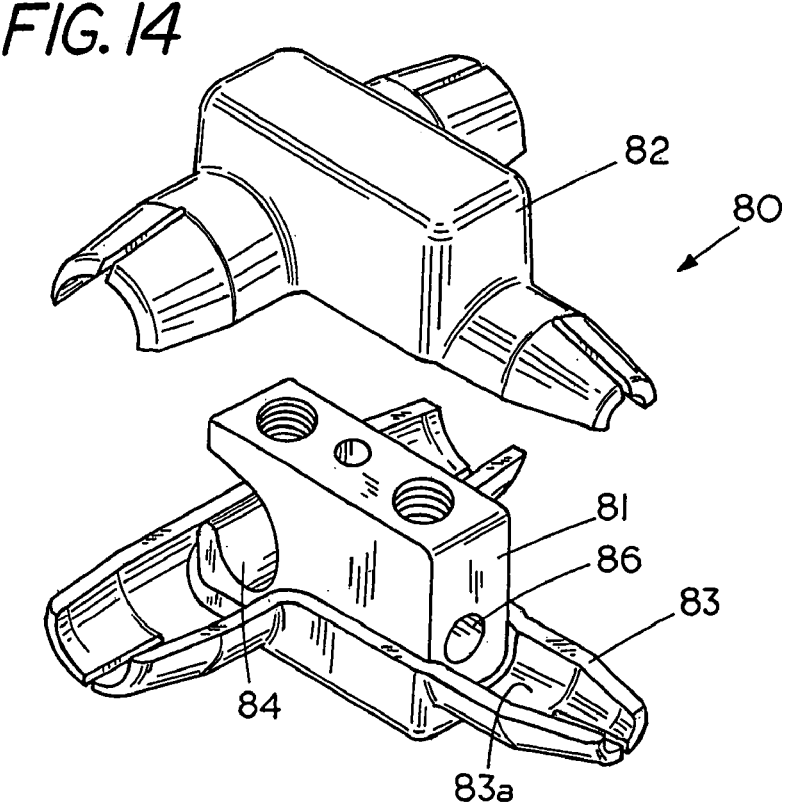
FIG. 14 shows the branch connector and two part cover of FIG. 13 in a partially assembled condition
Figure 15:
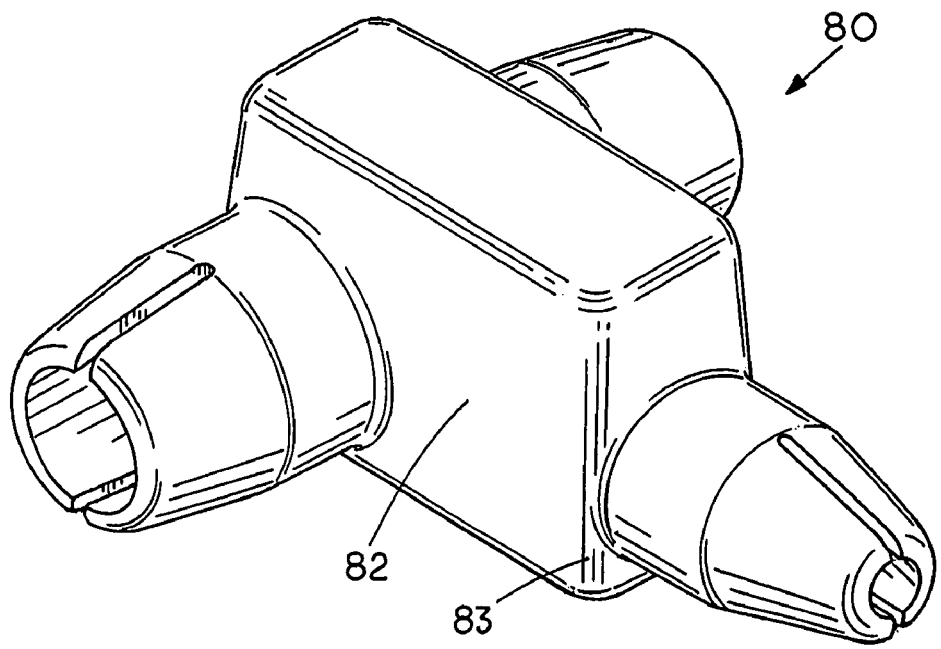
FIG. 15 shows the branch connector and two part cover of FIG. 13 in a fully assembled condition.
Figure 16:
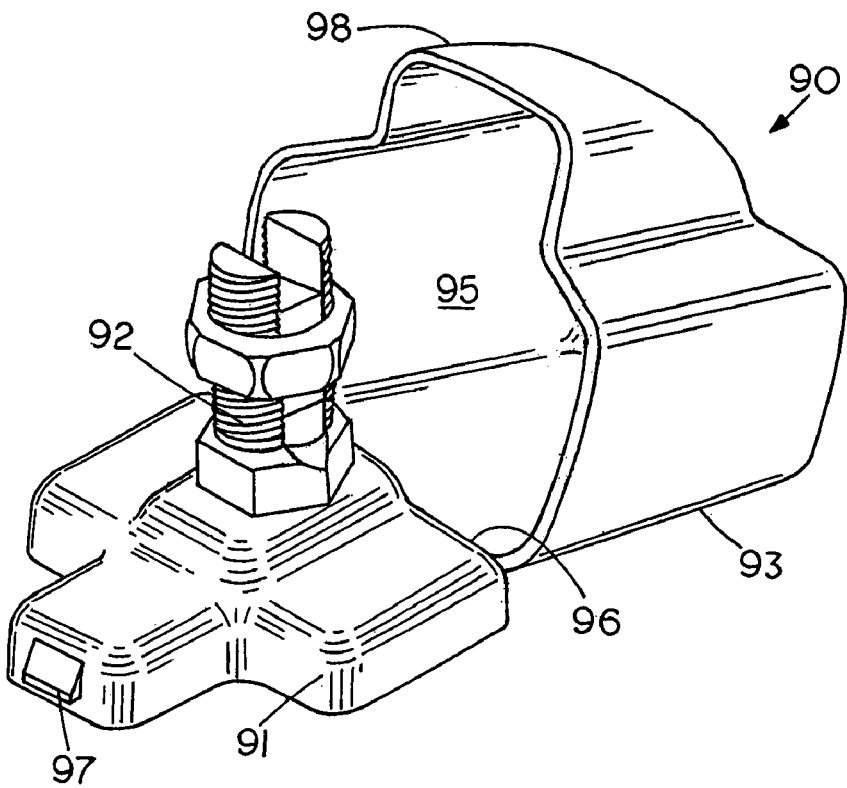
FIG. 16 shows a split bolt connector with a hinged cover that permits on-the-go sealibity of an electrical junction.

FIGS. 13-15 show a an alternate embodiment of an open face wire connector comprising a tee shaped branch connector 80 and a first housing 82 and a second housing 83 that permit on-the-go sealabilty of an electrical junction therein after the electrical connection has been formed in the wire connector lug which is free of sealant. The connector 80 includes a rectangular shaped wire-connecting lug 81 that is positionable in and between the first housing 82 and the second housing 83 to enable the two housings to surround the wire connector lug 81. The wire connector lug includes a first wire receiver 84, which is free of sealant, and a screw socket 85 for receiving a screw to secure a wire in the wire receiver 84. Located transverse to wire receiver 84 is a second wire receiver 86, which is also free of sealant, also having a screw socket for receiving a screw to secure a wire in wire receiver 86. Housing 83 contains a chamber 83a for holding a sealant and for receiving a portion of the wire connector lug 81. Similarly, housing 82 contains a substantially identical chamber (not shown) for receiving a further portion of the wire connector lug 81. When housing 82 and 83 are assembled, as shown in FIG. 15, the wire connector lug 81 is contained in the chambers in each of the housings and a sealant within one or both of the housings encapsulates the wire connection in the wire receiver 84 and 86. Once the housing 82 and housing 83 are assembled around the wire the housings can be latched to each other to hold the housings around the wires and the wire connector lug 81. If desired, latches can be included in the housings for self latching when the housings are brought to the assembled condition shown in FIG. 15 or electrical tape or the like can be used to secure the two housing to each other. In either case the sealant located in the chamber in one or both of the housings enable one to cover the connection as the sealant is brought into a wire encapsulating condition. In this embodiment of the open faced connector the lug 81 can float or be repositioned within the housings in response to the wire configuration FIGS. 16 and 17 show an alternate embodiment of the open face wire connector with the split bolt connector of FIGS. 10-13. The open face split bolt connector 90 includes a closed cover or first housing 93 having a chamber 95 for carrying a sealant therein. Cover 93 is hinged to a housing comprising a base 91 by a hinge 96 that comprises a protrusion for engaging a recess 93a in the cover 93. The split bolt connector 92 is identical to the split connector shown in FIG. 10 and is not described therein. The second housing comprise a tee shaped base 91 with a lip 97 thereon for engaging a latch 98 in cover 93 with the hinge 96 permit one step on-the-go sealability of an electrical junction by pivoting the first housing from the open face condition shown in FIG. 16 to the closed conditions shown in FIG. 17 thereby bringing the split bolt connector 92 from a sealant free condition to a sealant covered condition.

FIG. 17 shows a sectional view of split bolt connector with a hinged cover 93 of FIG. 16 with the cover latch 98 engaging lip 97 to hold the cover in position while the hinge 96 on the other side holds the other side of the cover housing 93 in position.

FIG. 18 shows another embodiment of open face connector 100, wherein the connector lug can remain free of sealant until after the electrical connection is made. Connector 100 includes a first housing 101 that connects to second housing 102 by a living hinge 111a. A split bolt connector 110 is located in a chamber in the second housing 102. A chamber in each of the housings can be formed into a single chamber identified by reference numeral 111. One end of housing 101 has a flexible extension 107 and the other end has a similar flexible extension 108. Similarly, the other end of housing 102 has flexible extension 105 and the other end has a flexible extension 106. Extension 106 mates with extension 108 and extension 107 mates with extension 105 when the open face connector 100 is brought into the closed condition as illustrated in FIGS. 19 and 20. In the embodiment shown in FIG. 18 the chamber 111b in housing 101 and the chamber 111c in housing 102 both carry a sealant and the split bolt connector 110, which is unsecured to the housing can be placed in the sealant in one of the chambers and the housings closed to bring the two chambers 111c and 111b with there sealant into an encapsulating condition.

FIG. 19 shows the open face connector 100 in the closed condition with latch 103 holding one side of housing 101 to the other side of housing 102. Similarly, a living hinge 111a holds the other side of housing 101 to the other side of housing 102 to provide a closed chamber therein for holding the split bolt connector 110 as well as a sealant. In the embodiment shown a wire 115 extends from one side of the joined housings 101 and 102 and a further wire extends 116 from the other side of the joined housings 101 and 102.

FIG. 20 is an end view showing that hinge 111 and latch 103 and 104 hold the housings together with extension 106 and 108 forming a conformable opening around wire 116 that extends therethrough. That is the closing of the housings 101 and, which are made from a material such as polypropylene can flexible conform around a wire located therebetween.

In use of the embodiment of FIG. 18 the two housings, which are joined by a living hinge 111a are folded together around the split bolt connector 110 which carries the two wires that are held in electrical contact. The latch 103 and the latch 104 on the housings engage each other to lock the housings 101 and 102 around the split bolt connector 110 which can be covered with a sealant (not shown) that can be carried in the chamber 111 of housing 101. In general, the sealant in the chamber comprises an amount sufficient to fill the chamber in the housing when the wire connector lug 110 is positioned in the chamber formed as the first housing 101 and the second housing 102 are brought into a closed condition.

Figure 21:
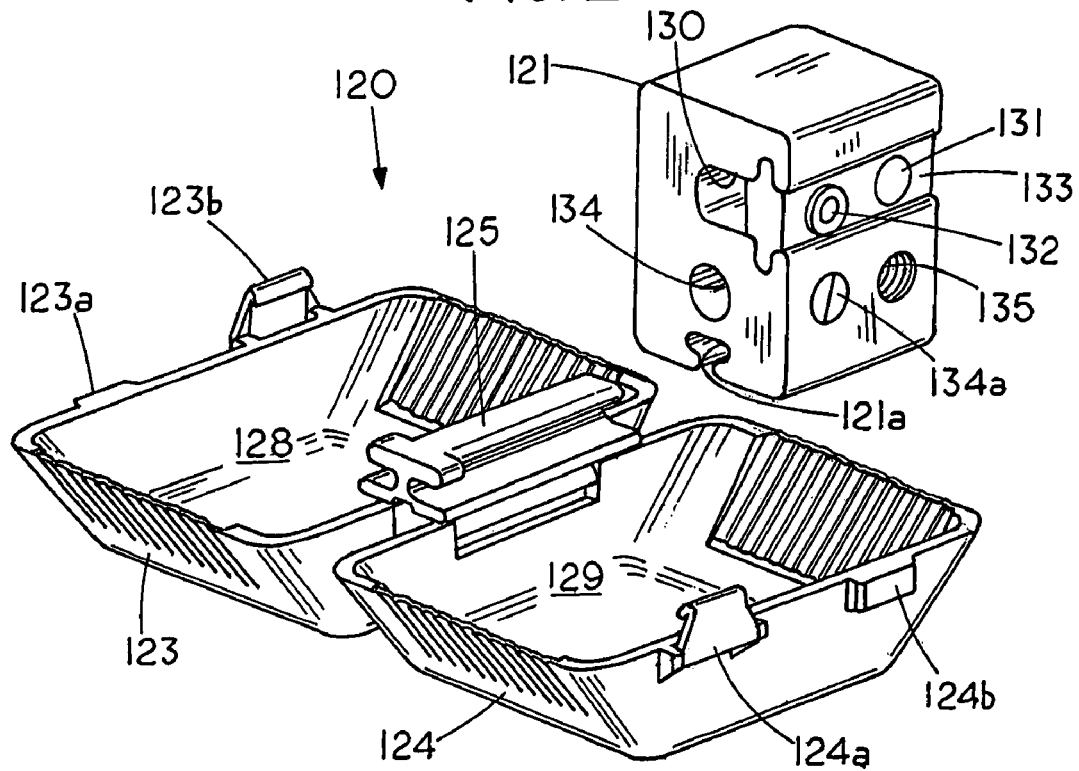
FIG. 21 is a perspective e view of an open face connector where the wire connector lug is securable to the housing.

FIG. 21 is a perspective e view of another embodiment of an open face connector 120 where the wire connector lug 121 is securable to a rail carried by housing 123 and 124. Housing 123 includes a first latch 123a for engagement with a latch 124a on housing 124 and a second latch 123b for engaging with latch 124b on housing 124. The housing 123 includes a chamber 128 and the housing 124 similarly includes a chamber 129 that is used to hold sealant as well as to encapsulating the wire connector lug 121 and the wire junction therein.

The wire connector lug 121 is similar to the other wire connector lugs in that wires are held in electrical connector with each other by placing the wires in the wire receiver 130 and 134 and rotating the respective wire engaging screws. That is by rotating screws 131 and 132 one can bring a wire in wire receiver 130 into electrical conduction with the wire engaging lug 121. Similarly, by rotating screw 134a one brings a wire in wire receiver into electrical connection with the wire connector lug 121. The wire connector lug 121 includes a Tee shaped channel 121a that sliding engages with a tee shaped rail 125 that is carried by housing 123 and 124. The tee shaped rail 125 can engage a tee shaped recess 121a in wire connector lug 121 to hold the wire proximate the housing 123 and 124 but outside of the chamber 128 or 129 which contains a sealant (not shown).

Figure 22:
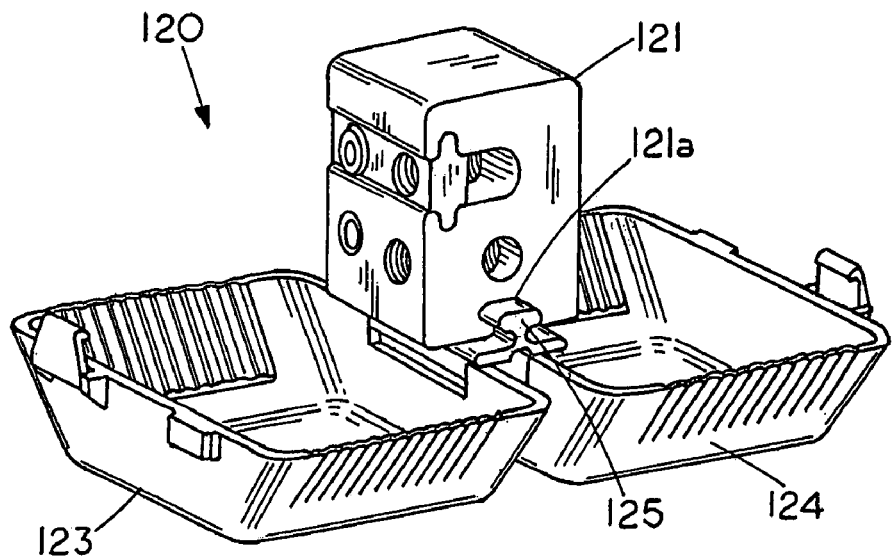
FIG. 22 shows the open face connector of FIG. 21 wherein the wire connector lug is secured to a rail retained by the shell of the open face connector.

FIG. 22 shows the open face connector of FIG. 21 wherein the wire connector lug is secured to a rail retained by the shell of the open face connector. This allows one to lock the lug to the shell.

In this embodiment the user can remove the wire connector lug 121 from the open face connector and secure the electrical wires thereto. Next, the user can secure the wire connector lug 121 to the rail 125 to hold the wire connector lug in position. Once secured thereto the user can bring housing 123 and housing 124 to the closed condition about the wire connector lug 121 to thereby bring the wire connector lug from a sealant free condition to a sealant encapsulated condition by merely closing the housing 123 and the housing 124 about the wire connector lug 121. An advantage of the embodiment of FIGS. 21 and 22 is that the wire connector lug can be removed for attachment yet it can be secured to the rail so that when the two housings are brought together the housings quickly and effectively encapsulate an electrical junction in the wire connecter lug 121.

We claim:

1. An open-face electrical connector comprising:
   a wire connector lug free of sealant;
   a first housing having a chamber therein;
   a second housing having a chamber therein with said first housing mateable with said second housing; and
   a sealant located in at least one of said chambers to enable the first housing to be secured to the second housing as the sealant is brought into a wire encapsulating condition around the wire connector lug;
   wherein at least one of said first housing and said second housing includes a rail with the wire connector lug positionable and maintainable on said rail when the open face connector is in either an open or closed condition; and
   wherein the wire connector lug is held outside of said chamber in either said first housing or said second housing prior to securing wires therein to maintain wire connector lug in a sealant free condition.

2. The open-face electrical connector of claim 1 wherein the lug includes wire receivers located parallel to each other to provide for forming a branch electrical connection.

3. The open-face connector of claim 1 wherein the first and second housing are substantially identical to each other.

4. The open face connector of claim 1 wherein the wire connector lug includes a threaded opening for receiving a threaded wire-engaging member.

5. The open face connector of claim 1 wherein the wire connector lug is removeably positionable between the first housing and the second housing.

6. The open face connector of claim 1 wherein the first housing includes a hinge on one side and a latch on the opposite side to enable the first housing to be pivoted about the wire connector lug to encapsulate the wire connector lug as the first housing is secured to the second housing.

* * * * *

UNITED STATES PATENT AND TRADEMARK OFFICE
CERTIFICATE OF CORRECTION

PATENT NO. : 7,507,126 B2  
APPLICATION NO. : 11/788339  
DATED : March 24, 2009  
INVENTOR(S) : Lloyd Herbert King, Jr. et al.

It is certified that error appears in the above-identified patent and that said Letters Patent is hereby corrected as shown below:

Title page should read

Item [60] Related U.S. Application Data

Division of application No. 11/372,237 filed Mar. 9, 2006 now Pat. No. 7,223,132, which is a continuation-in-part of application No. 10/724,980, filed on Dec. 2, 2003, now Pat. No. 7,044,776.

Signed and Sealed this

Fifteenth Day of September, 2009

David J. Kappos
*Director of the United States Patent and Trademark Office*